(12) United States Patent
Gendron-Bellemare et al.

(10) Patent No.: US 10,936,949 B2
(45) Date of Patent: Mar. 2, 2021

(54) TRAINING MACHINE LEARNING MODELS USING TASK SELECTION POLICIES TO INCREASE LEARNING PROGRESS

(71) Applicant: DeepMind Technologies Limited, London (GB)

(72) Inventors: Marc Gendron-Bellemare, London (GB); Jacob Lee Menick, London (GB); Alexander Benjamin Graves, London (GB); Koray Kavukcuoglu, London (GB); Remi Munos, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/508,042

(22) Filed: Jul. 10, 2019

(65) Prior Publication Data

US 2019/0332938 A1 Oct. 31, 2019

Related U.S. Application Data

(63) Continuation of application No. PCT/EP2018/054000, filed on Feb. 19, 2018.

(60) Provisional application No. 62/463,540, filed on Feb. 24, 2017.

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01)

(58) Field of Classification Search
CPC ................................ G06N 3/08; G06N 3/0445
See application file for complete search history.

(56) References Cited

U.S. PATENT DOCUMENTS 9,947,102 B2 * 4/2018 Xu ........................ G06N 3/084
2005/0025378 A1 * 2/2005 Maurer ................... G06T 5/002
382/260

(Continued)

OTHER PUBLICATIONS

Yang Fan et al., Neural Data Filter for Bootstrapping Stochastic Gradient Descent, Jan. 20, 2017, 13 pages.*

(Continued)

*Primary Examiner* — Alexey Shmatov
*Assistant Examiner* — Tri T Nguyen
(74) *Attorney, Agent, or Firm* — Fish & Richardson P.C.

(57) ABSTRACT

Methods, systems, and apparatus, including computer programs encoded on a computer storage medium, for training a machine learning model. In one aspect, a method includes receiving training data for training the machine learning model on a plurality of tasks, where each task includes multiple batches of training data. A task is selected in accordance with a current task selection policy. A batch of training data is selected from the selected task. The machine learning model is trained on the selected batch of training data to determine updated values of the model parameters. A learning progress measure that represents a progress of the training of the machine learning model as a result of training the machine learning model on the selected batch of training data is determined. The current task selection policy is updated using the learning progress measure.

22 Claims, 4 Drawing Sheets

(56) References Cited

U.S. PATENT DOCUMENTS

| | | | | |
|---|---|---|---|---|
| 2007/0211064 | A1* | 9/2007 | Buck | G06N 20/00 |
| | | | | 345/519 |
| 2009/0043597 | A1* | 2/2009 | Agarwal | G06Q 30/02 |
| | | | | 705/14.1 |
| 2013/0198152 | A1* | 8/2013 | McGhee | H03M 7/3088 |
| | | | | 707/693 |
| 2014/0330134 | A1* | 11/2014 | Chon | A61B 5/7282 |
| | | | | 600/479 |
| 2015/0161987 | A1* | 6/2015 | Horesh | G10L 15/063 |
| | | | | 704/232 |
| 2016/0307113 | A1* | 10/2016 | Calapodescu | G06F 16/285 |
| 2017/0199961 | A1* | 7/2017 | Yelensky | A61K 39/0011 |
| 2017/0228645 | A1* | 8/2017 | Wang | G06N 3/04 |
| 2018/0174038 | A1* | 6/2018 | Jiang | G06N 3/08 |
| 2018/0218080 | A1* | 8/2018 | Krishnamurthy | G06N 3/08 |
| 2018/0247200 | A1* | 8/2018 | Rolfe | G06N 3/0454 |
| 2019/0232488 | A1* | 8/2019 | Levine | B25J 9/1664 |

OTHER PUBLICATIONS

Arnold et al, "A corpus for the evaluation of lossless compression algorithms," IEEE Xplore, Mar. 1997, 10 pages.

Auer et al, "The nonstochastic multiarmed bandit problem" Society for Industrial and Applied Mathematics, 2002, 30 pages.

Barto, "Intrinsic motivation and reinforcement learning," Semantic Scholar, Nov. 10, 2012, 31 pages.

Bellemare et al, "Unifying count based exploration and intrinsic motivation" arXiv, Nov. 2016, 20 pages.

Bengio et al, "Curriculum learning" Proceedings of the 26th Annual International Conference on Machine Learning, 2009, 8 pages.

Blundell et al, "Weight uncertainty in neural networks" arXiv, May 2015 10 pages.

Bubeck et al, "Regret analysis of stochastic and nonstochastic multi-armed bandit problems" arXiv, Nov. 2012, 130 pages.

Elman, "Learning and development in neural networks: The importance of starting small," Elsevier Science Publisher, 1993.

Fabisch et al, "Accounting for task-difficulty in active multi-task robot control learning" Kuenstliche Intelligenz, vol. 29, No. 4, May 1, 2015 (May 1, 2015), pp. 369-377, XP035577036, DOI: 10.1007/S13218-015-0363-2 the whole document.

Fabisch et al, "Active contextual policy search" Journal of Machine Learning Research, vol. 15, Oct. 2014 (Oct. 2014), pp. 3371-3399, XP055475962, ISSN: 1533-7928 section 1-3.

Fan et al, "Neural data filter for bootstrapping stochastic gradient descent", Paper submitted on ICLR'17 (revision: Jan. 20, 2017 14:44), Jan. 20, 2017 (Jan. 20, 2017), XP055476460, Retrieved from the Internet URL: https://openreview.net/references/pdf?id=ByFN451wg [retrieved on May 14, 2018] sections 1 and 2.

Gong et al, "Teaching-to-learn and learning-to-teach for multi-label propagation", Proceedings of the 30th AAAI Conference on Artificial Intelligence (AAAI '16), Feb. 12, 2016 (Feb. 12, 2016), pp. 1610-1616, XP055475955, ISSN: 2374-3468 pp. 1611-1614.

Graves et al, "Hybrid computing using a neural network with dynamic external memory" Nature, Oct. 12, 2016, 21 pages.

Graves et al, "Neural turing machines" arXiv, Dec. 2014, 26 pages.

Graves, "Generating sequences with recurrent neural networks" arXiv, Aug. 2013, 43 pages.

Graves, "Practical variational inference for neural networks" Advances in Neural Informational Processing Systems, 2011, 9 pages.

Herbster et al, "Tracking the best expert" Machine Learning, 1998, 28 pages.

Hinton et al, "Keeping the neural networks simple by minimizing the description length of the weights" Proceedings of the sicth annual conference on Computational learning theory, 1993, 9 pages.

Houthooft et al, "Vime: Variational information maximizing exploration" arXiv, Nov. 2016, 9 pages.

Itti et al, "Bayesian surprise attracts human attention," NIPS, 2006, 8 pages.

Jiang et al, "Self-paced curriculum learning", Proceedings of the 29th AAAI Conference on Artificial Intelligence (AAAI '15), Jan. 25, 2015 (Jan. 25, 2015), pp. 2694-2700, XP055475953, ISSN: 2374-3468 pp. 2696 and 2967.

Kingma et al, "Auto-encoding variational bayes" arXiv, Dec. 2013, 14 pages.

Kingma et al, "Variational dropout and the local reparameterization trick" arXiv, Dec. 2015, 14 pages.

Kneser et al, "Improved backing-off form-gram language modeling," IEEE Xplore, May 1995, 4 pages.

Lopes et al, "The strategic student approach for life-long exploration and learning" IEEE International Conference on Decelopment and Learning and Epigenetic Robotics, Nov. 2012, 9 pages.

Oudeyer et al, "Intrinsic motivation systems for autonomous mental development" IEEE Transactions on Evolutionary Computation Apr. 2007, 22 pages.

PCT International Search Report and Written Opinion in International Application No. PCT/EP2018/054000, dated May 28, 2018, 15 pages.

Reed et al, "Neural programmer-interpreters" arXiv, Dec. 2015, 12 pages.

Rissanen, "Stochastic complexity and modeling" The Annals of Statistics, 1986, 21 pages.

Roy et al, "Toward optimal active learning through sampling estimation of error reduction" Proceeding 18th International Conference on Machine Learning, 2001, 8 pages.

Schmidhuber, "A possibility for implementing curiosity and boredom in model-building neural controllers" From animals to animats proceedings of the first international conference on simulation of adaptive behavior, 1991, 6 pages.

Settles et al, "Multiple-instance active learning" Advances in neural information processing systems, 2008, 8 pages.

Settles, "Active learning literature survey" University of Wisconsin Madison, Jan. 2010, 67 pages.

Storck et al, "Reinforcement driven information acquisition in nondeterministic environments" Proceedings of the International Conference on Artificial Neural Networks, 1995, 6 pages.

Sukhbaatar et al, "End-to-end memory networks" arXiv, Nov. 2015, 11 pages.

Sukhbaatar et al, "Learning to execute" arXiv, Oct. 2014, 8 pages.

Tieleman, "Lecture 6.5-rmsprop: Divide the gradient by a running average of its recent magnitude," Scientific Research.

Tsvetkov et al, "Learning the curriculum with bayesian optimization for task-specific work representation learning" arXIV, Jun. 2016, 10 pages.

Weston et al, "Towards ai-complete question answering: A set of prerequisite toy tasks" arXiv, Dec. 2015, 14 pages.

Wu et al, "Training agent for first-person shooter game with actor-critic curriculum learning", Paper submitted at ICLR '17 (revision: Feb. 5, 2017 23:05), Feb. 5, 2017 (Feb. 5, 2017), XP055476035, Retrieved from the Internet: URL: https://openreview.net/references/pdf?id=HyIoW7rdx [retrieved on May 14, 2018] section 4.3.

PCT International Preliminary Report on Patentability in International Appln. No. PCT/EP2018/054000, dated Aug. 27, 2019. 9 pages.

* cited by examiner

TRAINING MACHINE LEARNING MODELS USING TASK SELECTION POLICIES TO INCREASE LEARNING PROGRESS

BACKGROUND

This specification relates to training machine learning models.

Machine learning models receive an input and generate an output, e.g., a predicted output, based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network

SUMMARY

This specification describes a system implemented as computer programs on one or more computers in one or more locations that performs training of a machine learning model.

According to a first aspect there is provided a method for training a machine learning model having a plurality of model parameters, for example on a plurality of partitions, to determine trained values of the model parameters from initial values of the model parameters. The method may comprise receiving training data for training the machine learning model. The training data may, for example, be partitioned into a plurality of partitions or tasks. The method may further comprise identifying a plurality of tasks. Each task/partition may comprise a respective plurality of batches of training data.

The method may involve training the machine learning model on the training data by repeatedly performing the following operations: selecting a task/partition from the plurality of tasks/partitions in accordance with a current partition selection policy; selecting a batch of training data from the plurality of batches of training data for the selected task/partition; training the machine learning model on the selected batch of training data to determine updated values of the model parameters from current values of the model parameters; determining a learning progress measure that represents a progress of the training of the machine learning model as a result of training the machine learning model on the selected batch of training data; and updating the current partition selection policy using the learning progress measure.

Training data for the machine learning model may be partitioned into a plurality of partitions, with each partition including a respective plurality of batches of training data. A partition may correspond to a task, and vice-versa. For example, the training data in each of the partitions may be training data for tasks of a different nature, with the model being trained to perform well on all of the tasks. As another example, one of the partitions may be a target partition, with the model being trained to perform well on inputs similar to those in the training data in the target partition. In this example, the training data in the other partitions may be, e.g., data on which it is expected to be easier to train the model.

According to a second aspect there is provided a method of training a machine learning model having a plurality of model parameters to determine trained values of the model parameters from initial values of the model parameters, the method comprising: receiving training data for training the machine learning model on a plurality of tasks, wherein each task comprises a respective plurality of batches of training data; and training the machine learning model on the training data by repeatedly performing the following operations: selecting a task from the plurality of tasks in accordance with a current task selection policy; selecting a batch of training data from the plurality of batches of training data for the selected task; training the machine learning model on the selected batch of training data to determine updated values of the model parameters from current values of the model parameters; determining a learning progress measure that represents a progress of the training of the machine learning model as a result of training the machine learning model on the selected batch of training data; and updating the current task selection policy using the learning progress measure.

In some implementations, training the machine learning model on the selected batch comprises training the machine learning model to decrease a loss on the selected batch as measured by a loss function, and the learning progress measure is based on a decrease in the loss as a result of training the machine learning model on the selected batch of training data.

In some implementations, determining the learning progress measure comprises: determining a first loss on the selected batch in accordance with the current values of the model parameters; and determining a second loss on the selected batch in accordance with the updated values of the model parameters. The learning progress measure comprises a difference between the first loss and the second loss.

In some implementations, determining the learning progress measure comprises: sampling a new batch from the plurality of batches in the selected task; determining a first loss on the new batch in accordance with the current values of the model parameters; and determining a second loss on the new batch in accordance with the updated values of the model parameters, and the learning progress measure comprises a difference between the first loss and the second loss.

In some implementations, one of the tasks is identified as a target task that includes training inputs that are most similar to inputs to be processed by the machine learning model after the training of the machine learning model on the training data, and determining the learning progress measure comprises: sampling a new batch from the plurality of batches in the target task; determining a first loss on the new batch in accordance with the current values of the model parameters; and determining a second loss on the new batch in accordance with the updated values of the model parameters, and the learning progress measure comprises a difference between the first loss and the second loss.

In some implementations, determining the learning progress measure comprises: sampling a task randomly from the plurality of tasks; sampling a new batch from the plurality of batches in the sampled task; determining a first loss on the new batch in accordance with the current values of the model parameters; and determining a second loss on the new batch in accordance with the updated values of the model parameters, and the learning progress measure comprises a difference between the first loss and the second loss.

In some implementations, the learning progress measure comprises a norm of a gradient vector of gradients of the loss function with respect to the model parameters generated by training the machine learning model on the selected batch.

In some implementations, the learning progress measure is based on an increase in model complexity of the machine learning model as a result of training the machine learning model on the selected batch of training data.

In some implementations, values of the model parameters are defined by a posterior distribution over possible values of the model parameters, wherein during the training posterior distribution parameters that parameterize the posterior distribution are optimized such that the trained values of the model parameters are defined by trained values of the posterior distribution parameters, and wherein training the machine learning model on the selected batch of training data comprises training the machine learning model on the selected batch of training data to determine adjusted values of the posterior distribution parameters from current values of the posterior distribution parameters.

In some implementations, determining the learning progress measure comprises: determining a first Kullback-Leibler (KL) divergence between (i) the posterior distribution as defined by the updated values of the posterior distribution parameters and (ii) a prior distribution over possible values for the model parameters; and determining a second KL divergence between (i) the posterior distribution as defined by the current values of the posterior distribution parameters and (ii) a prior distribution over possible values for the model parameters, and the learning progress measure comprises a difference between the first KL divergence and the second KL divergence.

In some implementations, the prior distribution is defined by prior distribution parameters, and training the machine learning model on the selected batch of training data comprises determining adjusted values of the prior distribution parameters from current values of the prior distribution parameters, wherein the first KL divergence is a KL divergence between (i) the posterior distribution as defined by the updated values of the posterior distribution parameters and (ii) the prior distribution as defined by the updated values of the prior distribution parameters, and wherein the second KL divergence is a KL divergence between (i) the posterior distribution as defined by the current values of the posterior distribution parameters and (ii) the prior distribution as defined by the current values of the prior distribution parameters.

In some implementations, training the machine learning model on the selected batch of training data comprises determining adjusted values of prior distribution parameters from current values of prior distribution parameters, wherein the prior distribution parameters parametrize a prior distribution over possible values for the model parameters, and the learning progress measure is based on a) a gradient with respect to the posterior distribution parameters and the prior distribution parameters of a KL divergence between (i) the posterior distribution as defined by the current values of the posterior distribution parameters and (ii) the prior distribution as defined by the current values of the prior distribution parameters and b) a gradient with respect to the posterior distribution parameters of the expectation of a loss on the selected batch as measured by a loss function.

In some implementations, the learning progress measure is based on a difference between a first norm of a vector of the updated values of the model parameters and a second norm of a vector of the current values of the model parameters.

In some implementations, the learning progress measure is based on a product between (i) a transpose of a vector of the current values of the model parameters and (ii) a gradient vector of gradients of a loss function with respect to the model parameters generated as part of training the machine learning model on the selected batch.

In some implementations, the task selection policy is a policy that assigns a respective likelihood to each of the plurality of tasks, and selecting a task from the plurality of tasks in accordance with the current task selection policy comprises stochastically selecting the task in accordance with the likelihoods assigned by the current task selection policy.

In some implementations, the task selection policy is an adversarial bandits policy, wherein updating the current task selection policy using the learning progress measure comprises: determining a payoff from the learning progress measure; and updating the current task selection policy based on the payoff using an adversarial bandits algorithm.

In some implementations, determining the payoff comprises: normalizing the learning progress measure to generate a normalized learning progress measure by dividing the learning progress measure by a normalization factor for the selected task; and generating the payoff by scaling the normalized learning progress measure to fall within a payoff range.

In some implementations, the normalization factor for the selected task is a time required for the machine learning model to generate outputs for training inputs in the selected task or an approximation of the time required.

In some implementations, the approximation is a number of time steps required for the machine learning model to generate outputs for training inputs in the selected batch, or a number of individual inputs in each of the training inputs in the selected batch.

In some implementations, selecting a batch of training data from the plurality of batches of training data in the selected task comprises: randomly selecting a batch of training data from the plurality of batches of training data in the selected task.

In some implementations, the machine learning model is a recurrent neural network.

According to a third aspect there is provided a method for training a machine learning model having a plurality of model parameters to determine trained values of the model parameters from initial values of the model parameters, the method comprising: receiving training data for training the machine learning model, wherein the training data is partitioned into a plurality of partitions, and wherein each partition comprises a respective plurality of batches of training data; and training the machine learning model on the training data by repeatedly performing the following operations: selecting a partition from the plurality of partitions in accordance with a current partition selection policy; selecting a batch of training data from the plurality of batches of training data in the selected partition; training the machine learning model on the selected batch of training data to determine updated values of the model parameters from current values of the model parameters; determining a learning progress measure that represents a progress of the training of the machine learning model as a result of training the machine learning model on the selected batch of training data; and updating the current partition selection policy using the learning progress measure.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. By dynamically modifying the task selection policy during training, the training system as described in this specification can adapt the policy to the model's capabilities as they evolve over the course of training. Moreover, the training system as described in this specification can measure learning progress using novel learning progress signals based on the rate at which the complexity of the machine learning model increases. By incorporating these (and other) improvements, the training system as described in this specification can train machine learning models faster (e.g., over fewer training iterations) than conventional training systems that do not incorporate these improvements. Because the training system as described in this specification can train machine learning models faster than conventional training systems, the training system as described in this specification may consume fewer computational resources (e.g., memory and computing power) than conventional training systems.

For example, by adaptively modifying the task selection policy during training to take into account the model's changing capabilities, the training system as described in this specification can train the machine learning model on a progression of tasks that maximize the learning progress of the machine learning model. By maximizing the learning progress of the machine learning model during training, the training system as described in this specification may require fewer training iterations to train the machine learning model relative to training systems with static task selection policies.

As another example, the rate at which the complexity of the machine learning model increases may be a more accurate learning progress signal (i.e., may better reflect the actual learning progress of the machine learning model) than conventional learning progress signals. By measuring learning progress based on more accurate learning progress signals, the training system as described in this specification maximizes the learning progress of the machine learning model during training, and thereby may require fewer iterations to train the machine learning model.

Moreover, the training system as described in this specification may determine trained machine learning model parameters that result in better task performance (e.g., higher prediction accuracy) of the trained machine learning model relative to machine learning models that are trained by conventional training systems. In particular, because the training system as described in this specification achieves greater learning progress of the machine learning model during training relative to conventional training systems (as previously described), a machine learning model trained for a fixed number of iterations by the training system as described in this specification may have better task performance relative to a machine learning model trained by a conventional training system for the same fixed number of iterations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
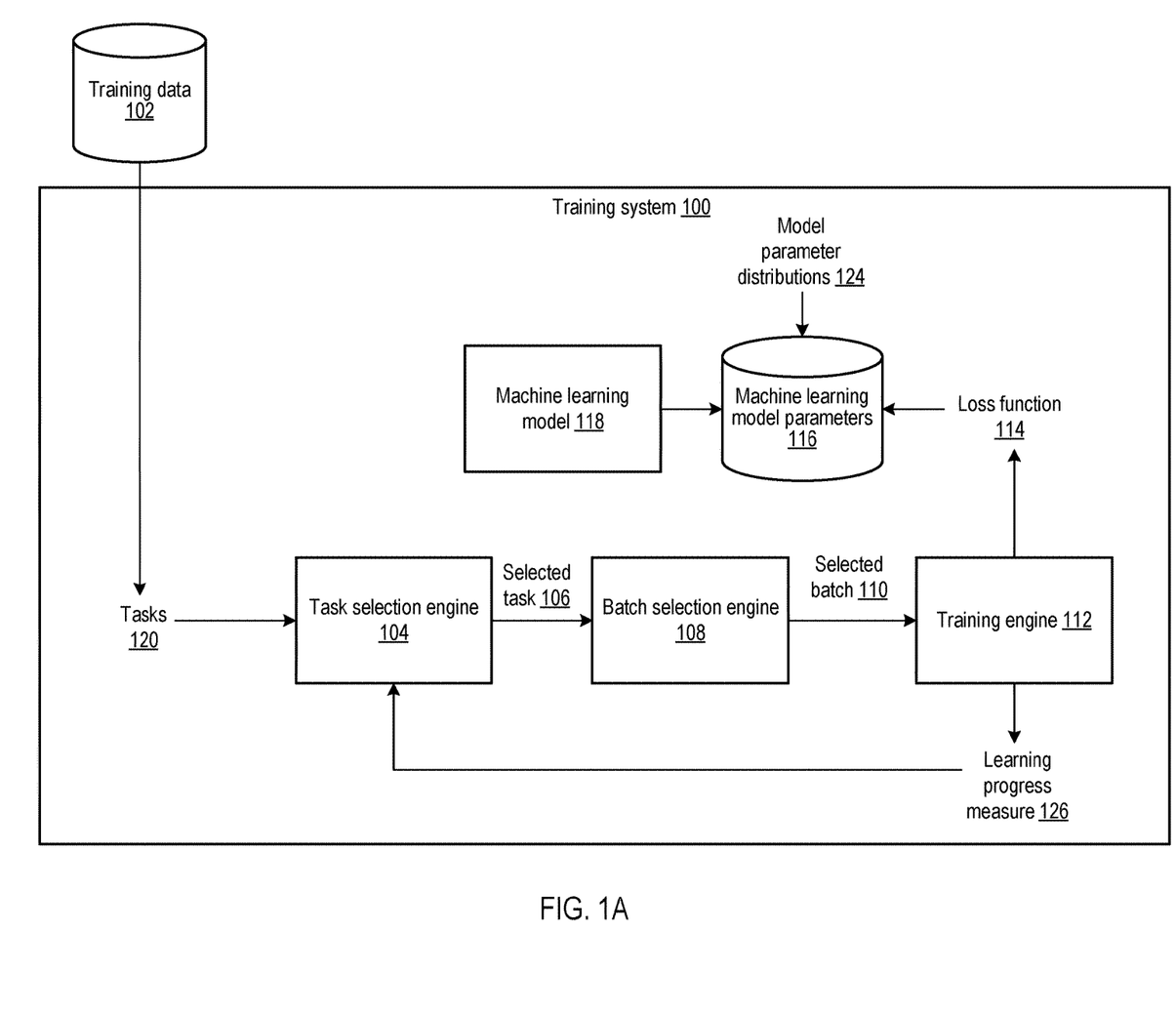
FIG. 1A shows an example training system.

FIG. 1A shows an example training system 100. The training system 100 is an example of a system implemented as computer programs on one or more computers in one or more locations in which the systems, components, and techniques described below are implemented.

The training system 100 is configured to train a machine learning model 118 based on training data 102.

The model 118 is configured to receive an input and to process the input in accordance with current values of a set of machine learning model parameters 116 to generate an output for the input. For example, if model 118 is a neural network, then the model parameters 116 may include the weight values of the neuron connections of the neural network. The current values of the set of model parameters 116 may be sampled from a model parameter distribution 124 that defines a probability distribution over the set of possible values of the model parameters 116. For example, the model parameter distribution 124 may characterize each of the model parameters by a Normal distribution with a different mean and standard deviation.

The model 118 can be any of a variety of supervised machine learning models, such as a neural network model (e.g., a recurrent neural network), a random forest model, a support vector machine model, or a linear regression model. In general, the model 118 can be configured to receive any kind of digital data input, including but not limited to image, video, sound, and text data, and to generate any kind of score, prediction, classification, or regression output based on the input. The output data may of the same type or modality as the input data, or different. Some applications of the model are described below; other applications include use in a machine-control system.

For example, if the inputs to the model 118 are images or features that have been extracted from images, the output generated by the model 118 for a given image may be scores for each of a set of object categories, with each score representing an estimated likelihood that the image depicts an object belonging to the category.

As another example, if the inputs to the model 118 are Internet resources (e.g., web pages), documents, or portions of documents or features extracted from Internet resources, documents, or portions of documents, the output generated by the model 118 for a given Internet resource, document, or portion of a document may be a score for each of a set of topics, with each score representing an estimated likelihood that the Internet resource, document, or document portion is about the topic.

As another example, if the inputs to the model 118 are features of an impression context for a particular advertisement, the output generated by the model 118 may be a score that represents an estimated likelihood that the particular advertisement will be clicked on.

As another example, if the inputs to the model 118 are features of a personalized recommendation for a user, e.g., features characterizing the context for the recommendation, e.g., features characterizing previous actions taken by the user, the output generated by the model 118 may be a score for each of a set of content items, with each score representing an estimated likelihood that the user will respond favorably to being recommended the content item.

As another example, if the input to the model 118 is a sequence of text in one language, the output generated by the model 118 may be a score for each of a set of pieces of text in another language, with each score representing an estimated likelihood that the piece of text in the other language is a proper translation of the input text into the other language.

As another example, if the input to the model 118 is a sequence representing a spoken utterance, the output generated by the model 118 may be a score for each of a set of pieces of text, each score representing an estimated likelihood that the piece of text is the correct transcript for the utterance.

The training data 102 includes multiple training examples. Each training example includes an input to the model 118 and a corresponding target output. The target output corresponding to an input refers to a preferred output of the model 118 in response to processing the input. The training data 102 includes data specifying multiple tasks 120. A task is a set of multiple batches of training examples from the training data 102. A batch of training examples refers to a set of one or more training examples. An illustration of examples of training data, tasks, batches, and training examples is described with reference to FIG. 1B.

In general, a particular training example may be included in multiple batches, a particular batch of training data may be included in multiple tasks, and different batches may include different numbers of training examples.

The system 100 trains the model 118 to perform well (i.e., to make accurate predictions) for training examples in each different task. A model is said to make an accurate prediction for a training example if, by processing the input of the training example, the model generates an output that is similar to a target output of the training example. For example, the system 100 may train the model 118 with the goal of minimizing the objective function:

$$\frac{1}{N}\sum_{k=1}^{N}\mathcal{L}_k,$$

where N is the number of different tasks and $\mathcal{L}_k$ is the loss of the model 118 on task k, where the loss of the model 118 on a task may be given by:

$$\mathcal{L}_k = \mathbb{E}_{x \sim D_k}[L(x)],$$

where $\mathbb{E}_{x \sim D_k}$ refers to the expected value with respect to batches included in task k and L(x) refers to a loss function 114 evaluated on outputs generated by the model 118 for inputs of training examples in batch x. In general, the loss function 114 measures the accuracy of the outputs generated by the model 118 (as will be described in more detail below with reference to the description of 210).

Each task includes batches of training examples of a different nature. In general, training the model 118 to perform well for training examples in a particular task can cause the model to perform better (i.e., to make more accurate predictions) for training examples in other tasks. In some cases, training examples in different tasks may have different semantics. For example, if the system 100 trains the model 118 to perform machine translation, then training examples in different batches may correspond to translations of text sequences between different languages. In some cases, the training data 102 includes data specifying that one or more of the tasks are target tasks, which are tasks that include training examples with inputs that are most similar to inputs to be processed by the model 118 after training of the model 118. In these cases, the system 100 may train the model 118 to perform well for training examples in the target tasks. In these cases, tasks other than the target tasks (referred to in this specification as auxiliary tasks) may include batches of training examples on which it is expected to be easier to train the model 118. Training the model 118 on the auxiliary tasks may be helpful in improving the performance of the model 118 on the target tasks. For example, the system 100 may train the model 118 with the goal of minimizing an objective function given by: $\mathcal{L}_N$, where task N is the target task (and the other tasks are auxiliary tasks) and $\mathcal{L}_N$ refers to the loss of the model 118 on task N (as described above).

The system 100 trains the model 118 over multiple iterations of an iterative training procedure.

The system 100 includes a task selection engine 104 that is configured to, at each of the multiple iterations, determine a selected task 106 from the tasks 120. The task selection engine 104 determines the selected task 106 for the iteration based on a task selection policy. The task selection engine 104 updates the task selection policy at each iteration using a learning progress measure 126 determined for the iteration. For example, the task selection policy may be an adversarial bandit algorithm. An example process for updating a task selection policy is described with reference to FIG. 3.

The system 100 includes a batch selection engine 108 that is configured to, at each iteration, determine a selected batch 110 of training examples from the selected task 106 for the iteration. The batch selection engine 108 determines the selected batch 110 by randomly sampling a batch from the selected task 106.

The system 100 includes a training engine 112 that is configured to, at each iteration, train the model 118 based on the selected batch 110 for the iteration and the loss function 114.

In some implementations, the training engine 112 trains the model 118 by determining updated values of the model parameters 116 from current values of the model parameters 116 in order to decrease a loss on the selected batch as measured by the loss function 114.

In some other implementations, the training engine trains the model 118 by determining updated parameter values of the model parameter distributions 124 from current parameter values of the model parameter distributions 124 in order to decrease a loss on the selected batch as measure by the loss function 114.

The training engine 112 determines a learning progress measure 126 for each iteration. In general, the learning progress measure 126 for an iteration is a scalar value indicating a progress of training the model 118 as a result of training the model 118 on training examples from the selected batch 110 for the iteration.

In some implementations, when the system 100 determines that the training of the model 118 is complete, the system 100 stores the model 118 and the trained model parameters 116. In some implementations, when the system 100 determines that the training of the model 118 is complete, the system 100 provides the model 118 and the model parameters 116 to a third-party. In some implementations, when the system 100 determines that the training of the model 118 is complete, the system 100 uses the model 118 to process inputs (e.g., from a user device) in accordance with the trained model parameters 116 and provides the corresponding outputs of the model 118, e.g., to the user device.

Figure 1B:
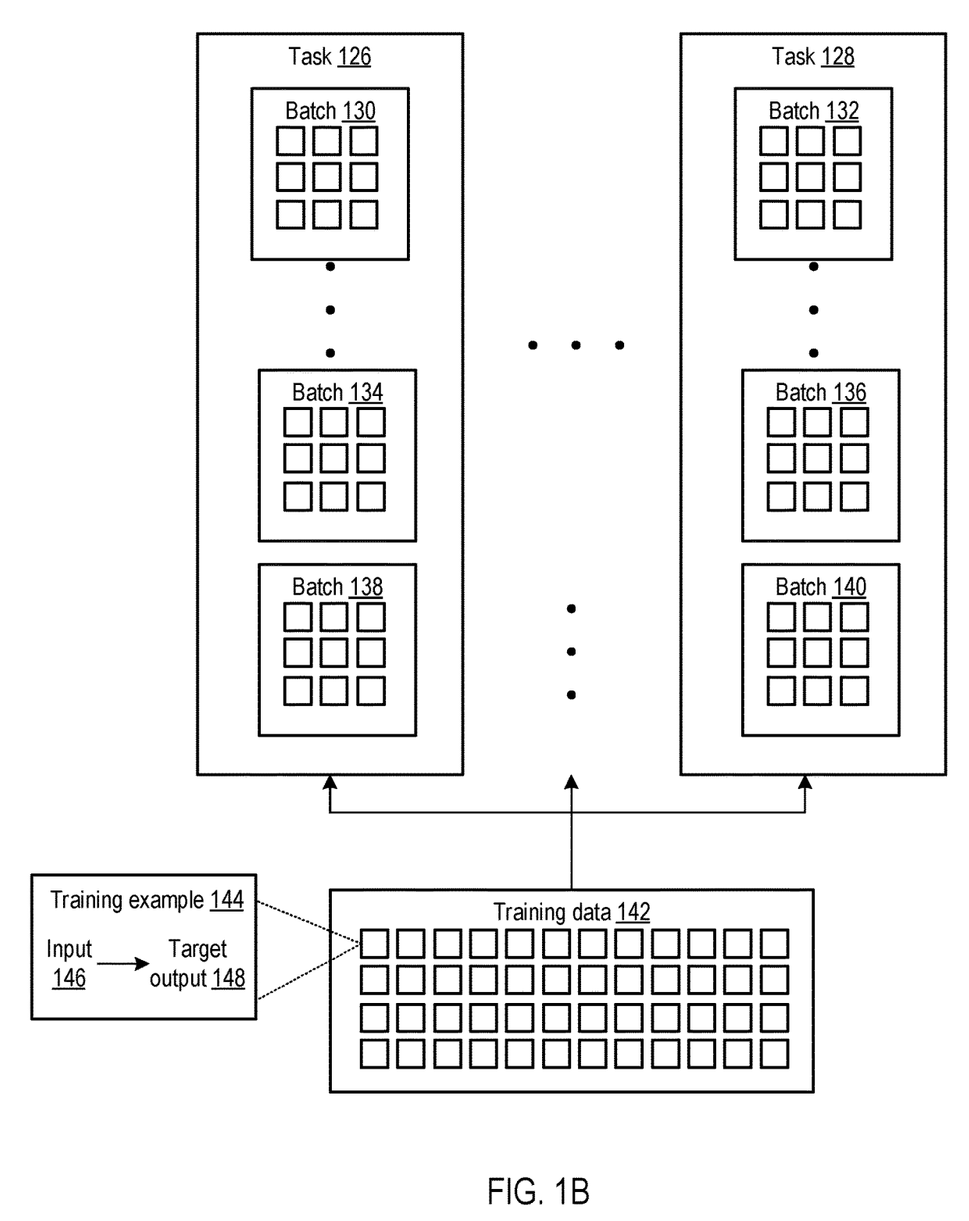
FIG. 1B shows examples of training data, tasks, batches, and training examples.

FIG. 1B is an illustration of examples of training data, tasks, batches, and training examples. The training data 142 includes multiple training examples (e.g., 144). Each training example includes an input (e.g., 146) and a corresponding target output (e.g., 148). Each batch (e.g., 130, 132, 134, 136, 138, 140, ...) includes multiple training examples from the training data 142. Each of the tasks (e.g., 126, 128, ...) is a set of multiple batches of training examples. For example, task 126 is associated with batches 130, 134, 138, and so on, while task 128 is associated with batches 132, 136, 140, and so on. As described above, different batches of training data can include different numbers of training examples, and different tasks can be associated with different numbers of batches.

Figure 2:
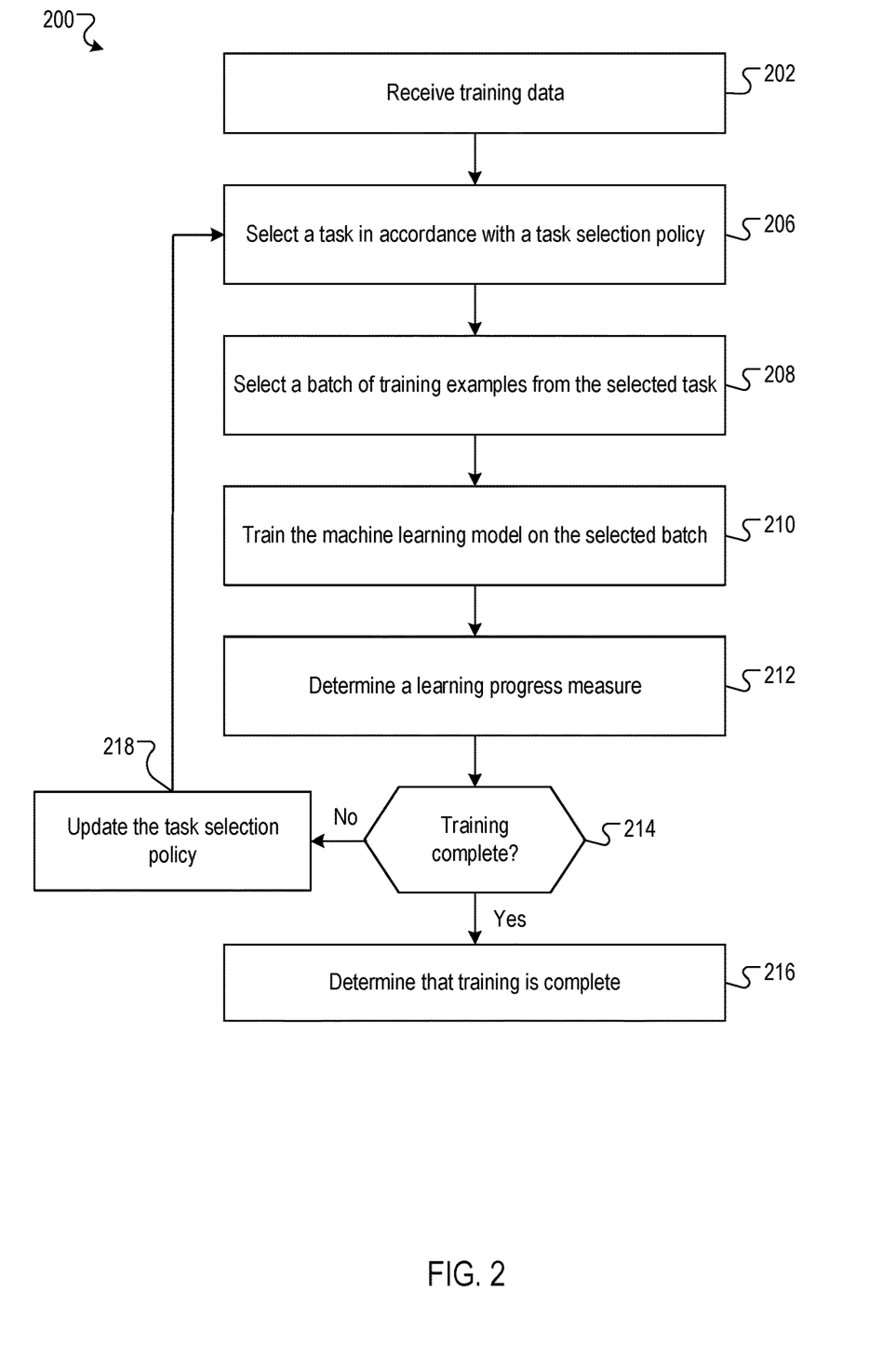
FIG. 2 is a flow diagram of an example process for training a machine learning model.

FIG. 2 is a flow diagram of an example process for training a machine learning model. For convenience, the process 200 will be described as being performed by a system of one or more computers located in one or more locations. For example, a training system, e.g., the training system 100 of FIG. 1, appropriately programmed in accordance with this specification, can perform the process 200.

The system receives training data (202). The training data includes multiple training examples. Each training example includes an input to the machine learning model and a corresponding target output. The inputs can be any kind of digital data and the target outputs can be any kind of score, classification, or regression output based on the inputs. The training data specifies multiple tasks. Each task is a set of multiple batches of training examples from the training data.

The system selects a task in accordance with a task selection policy (206). Specifically, the task selection policy assigns a respective probability to each of the tasks and the system stochastically selects a task in accordance with the respective probabilities assigned to each of the tasks. In general, the respective probabilities assigned to each of the tasks differ from iteration to iteration.

The system selects a batch of training examples from the selected task for the iteration (208). The system selects the batch by randomly sampling a batch from the selected task.

The system trains the model based on the selected batch of training examples for the iteration (210). The system can train the model based on the selected batch of training examples for the iteration using any appropriate training technique. For example, if the model is a neural network, then the system can train the model using gradient descent.

In some implementations, the system trains the model by determining updated values of the model parameters from current values of the model parameters in order to decrease a loss on the selected batch as measured by a loss function. For example, the loss function may be given by:

$$L(x, \theta) = -\log\left(\prod_{i=1}^{B} p_\theta(b^i | a^i)\right),$$

where B is the number of training examples in batch x, i indexes the training examples in batch x, $\theta$ refers to the parameters of the model, and $p_\theta(b^i|a^i)$ is a conditional probability generated by the model of target output $b^i$ corresponding to input $a^i$.

In some other implementations, the system trains the model by determining updated parameter values of model parameter distributions over possible values of the model parameters from current parameter values of model parameter distributions over possible values of the model parameters in order to decrease a loss on the selected batch as measured by a loss function. The model parameter distributions include a distribution referred to as a prior distribution and a distribution referred to as a posterior distribution. The posterior distribution is a distribution which is modified by the training. In some cases, the prior distribution may be fixed, in which case the parameter values of the prior distribution are not updated by the system during training. The loss function may be given by:

$$L_C(x, \phi, \psi) = \frac{1}{S} KL(P_\phi | Q_\psi) + \mathbb{E}_{\theta \sim P_\phi}[L(x, \theta)],$$

where S is the number of training examples in the training data, $KL(\cdot|\cdot)$ is the Kullback-Leibler (KL) divergence measure (i.e., a distance measure between probability distributions), $\phi$ refers to the posterior distribution parameters, $P_\phi$ is the posterior distribution over the possible values of the model parameters, $\psi$ refers to the prior distribution parameters, $Q_\psi$ is the prior distribution over the possible values of the model parameters, and $\mathbb{E}_{\theta \sim P_\phi}[L(x,\theta)]$ refers to the expected value of a loss $L(x,\theta)$ on the selected batch (e.g., as described above) when the model parameters are given by $\theta$, where $\theta$ is drawn from the posterior distribution $P_\phi$. An example process for training a model by determining updated parameter values of model parameter distributions is described with reference to, for example, Graves, A., "Practical variational inference for neural networks," Advances in Neural Information Processing Systems (NIPS), 2348-2356, 2011.

The system determines a learning progress measure for the iteration (212).

In some implementations, the learning progress measure is based on changes in the outputs of the model that are caused by training the model on the selected batch.

For example, the learning progress measure may be given by:

$$L(x,\theta)-L(x,\theta'),$$

where $L(x,\theta)$ refers to the value of the loss function evaluated on the outputs generated by the model in accordance with the current values $\theta$ of the model parameters for inputs in the selected batch x, and $L(x,\theta')$ refers to the value of the loss function evaluated on the outputs generated by the model in accordance with the updated values $\theta'$ of the model parameters for inputs in the selected batch x.

As another example, the learning progress measure may be given by:

$$|\nabla_\theta L(x,\theta)|,$$

where $\nabla_\theta L(x,\theta)$ refers to a gradient vector of gradients of the loss function $L(x,\theta)$ with respect to the current values of the model parameters $\theta$ generated as part of training the model on the selected batch x, and |•| refers to a norm. For example, the norm may be a squared $L_2$ norm.

As another example, the learning progress measure may be given by:

$$L(x',\theta)-L(x',\theta'),$$

where $L(x',\theta)$ refers to the value of the loss function evaluated on the outputs generated by the model in accordance with the current values $\theta$ of the model parameters for inputs in a new batch x', and $L(x',\theta')$ refers to the value of the loss function evaluated on the outputs generated by the model in accordance with the updated values $\theta'$ of the model parameters for inputs in the new batch x'. In some cases, the system selects the new batch from the selected task. In some other cases, the system selects the new batch from a target task. In some other cases, the system randomly selects a new task and selects the new batch from the randomly selected new task. Given a particular task from which the system selects the new batch, the system randomly selects the new batch from the batches of the particular task.

In some implementations, the learning progress measure is based on changes in the complexity of the model that are caused by training the model on the selected batch.

For example, the learning progress measure may be given by:

$$|\theta'|-|\theta|,$$

where |•| refers to a norm (e.g., a squared $L_2$ norm), $\theta'$ refers to the vector of updated values of the model parameters, and $\theta$ refers to the vector of current values of the model parameters.

As another example, the learning progress measure may be given by:

$$\theta^T \nabla_\theta L(x,\theta),$$

where $\theta^T$ refers to the transpose of a vector of the current values of the model parameters and $\nabla_\theta L(x,\theta)$ refers to the gradient of the loss function with respect to the model parameters $\theta$ on the selected batch x.

As another example, the learning progress measure may be given by:

$$KL(P_\phi|Q_\psi)-KL(P_\phi|Q_\psi),$$

where KL(•|•) refers to the KL divergence measure, P refers to the posterior distribution as defined by the updated values of the posterior distribution parameters, $P_\phi$ refers to the posterior distribution as defined by the current values of the posterior distribution parameters, and $Q_\psi$ refers to the prior distribution over possible values for the model parameters as defined by the current values of the prior distribution parameters. If the system updates the values of the prior distribution parameters during training, then $Q_{\psi'}$ refers to the prior distribution as defined by the updated values of the prior distribution parameters. If the system does not update the values of the prior distribution parameters during training, then $Q_{\psi'}$ refers to the same prior distribution as $Q_\psi$.

As another example, the learning progress may be given by:

$$[\nabla_{\phi,\psi}KL(P_\phi|Q_\psi)]^T \nabla_\phi \mathbb{E}_{\theta \sim P_\phi}[L(x,\theta)],$$

where $\nabla_{\phi,\psi}KL(P_\phi|Q_\psi)$ refers to a gradient with respect to the posterior distribution parameters $\phi$ and the prior distribution parameters $\psi$ of the KL divergence between the posterior distribution $P_\phi$ as defined by the current values of the posterior distribution parameters and the prior distribution $Q_\psi$ as defined by the current values of the prior distribution parameters, $[\bullet]^T$ refers to the transpose operation, and $\nabla_\phi \mathbb{E}_{\theta \sim P_\phi}[L(x,\theta)]$ refers to the gradient with respect to the posterior distribution parameters of the expectation of a loss $L(x,\theta)$ on the selected batch, where the expectation is taken with respect to model parameters $\theta$ drawn from the posterior distribution $P_\phi$.

The system determines whether the training is complete (214). In some cases, the system determines that the training is complete if the system has trained the model for a predetermined number of iterations. In some cases, the system determines that the training is complete if the measures of learning progress fall below a predetermined threshold for a predetermined number of iterations.

In response to determining that the training is not complete, the system updates the task selection policy based on, that is dependent upon, the determined learning progress measure for the iteration (218), returns to 206, and repeats the preceding steps. An example process for updating a task selection policy is described with reference to FIG. 3. In response to determining that the training is complete (218), the system terminates the training.

Figure 3:
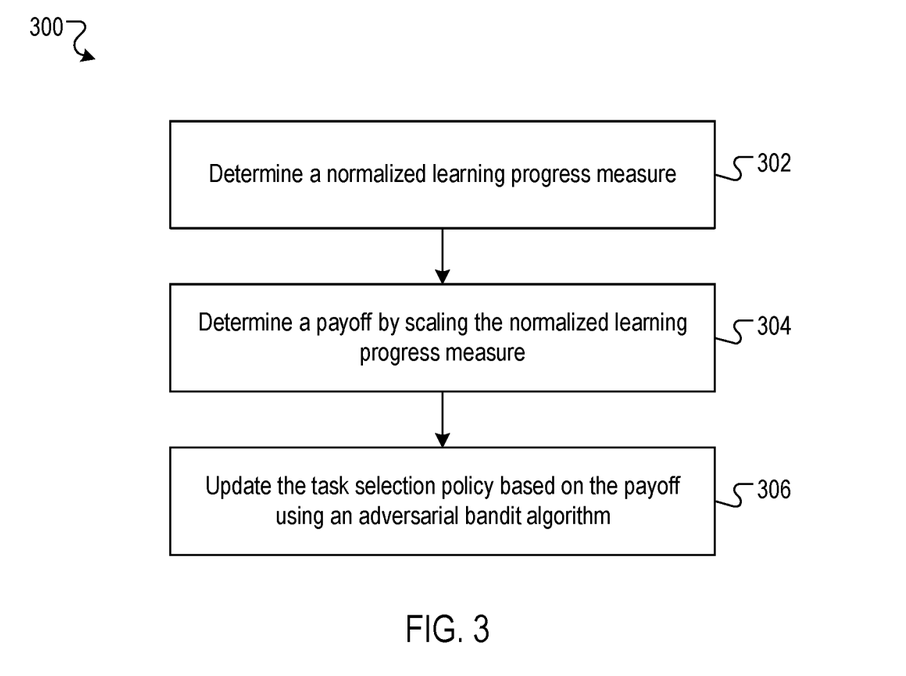
FIG. 3 is a flow diagram of an example process for updating a task selection policy.

FIG. 3 is a flow diagram of an example process for updating a task selection policy. For convenience, the process 300 will be described as being performed by a system of one or more computers located in one or more locations. For example, a training system, e.g., the training system 100 of FIG. 1, appropriately programmed in accordance with this specification, can perform the process 300.

The system determines a normalized measure of learning progress for the iteration (302). The system determines the normalized measure of learning progress for the iteration by dividing the measure of learning progress for the iteration by a normalization factor.

In some implementations, the normalization factor is the time required for the model to generate outputs for the inputs of the training examples in the selected task. The time may be measured in time steps.

In some implementations, particularly when the model is configured to process inputs over a sequence of time steps (e.g., if the model is a recurrent neural network), then normalization factor is the number of time steps required for the model to generate outputs for the inputs of the training examples of the selected batch.

In some implementations, the normalization factor is the number of individual inputs in each of the inputs of the training examples in the selected batch. For example, if the inputs are sequences of words in a natural language (e.g., English), then the number of individual inputs in an input may be the number of words in the input.

The system determines a payoff for the iteration using the learning progress measure, for example by scaling the normalized learning progress measure to fall within a payoff range (304), which may be a predetermined range. The system determines a lower percentile and an upper percentile (e.g., the $20^{th}$ and $80^{th}$ percentiles, or any other appropriate percentiles) of the normalized learning progress measures determined for previous iterations. In some cases, the system determines the respective percentiles based on the normalized learning progress measures of a representative sample of previous iterations rather than for all previous iterations. For example, an iteration may be included in the representative sample of previous iterations if the index of the iteration is divisible by a fixed factor (e.g., 10). The system determines the payoff for the iteration by mapping the normalized learning progress measure for the iteration to fall within the predetermined range, for example, based on the mapping:

$$\text{payoff} = \begin{cases} \frac{2(r - p_{low})}{p_{high} - p_{low}} - 1, & \text{if } r \in [p_{low}, p_{high}] \\ -1, & \text{if } r < p_{low} \\ 1, & \text{if } r > p_{high} \end{cases}$$

where r is the normalized learning progress measure for the iteration, $p_{low}$ is the lower percentile, and $p_{high}$ is the upper percentile, and the predetermined range is $[-1,1]$.

The system updates the task selection policy based on the payoff for the iteration using an adversarial bandit algorithm. For example, the adversarial bandit algorithm may be the Exp3.S algorithm, as described in Auer, P., Cesa-Bianchi, N., Freund, Y., Schapire, R. E., "The nonstochastic multi-armed bandit problem," SIAM Journal on Computing, 32(1): 48-77. As another example, the adversarial bandit algorithm may be the Exp3.M algorithm, as described in Uchiya, T., Nakamura, A., Kudo, M., "Algorithms for adversarial bandit problems with multiple plays," Proceedings of the International Conference on Algorithmic Learning Theory, 2010. An adversarial bandits algorithm may be described as an algorithm in which actions are selected with the aim of minimizing regret, which may be defined as the expected payoff lost when compared with the best action. Using an adversarial bandit algorithm, the system updates the task selection policy by updating the respective selection probabilities of the tasks with the aim of maximizing the sum of the payoffs achieved over the multiple training iterations.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a machine learning model having a plurality of model parameters to determine trained values of the model parameters from initial values of the model parameters, wherein values of the model parameters are defined by a posterior distribution over possible values of the model parameters, the method comprising:
   receiving training data for training the machine learning model on a plurality of tasks, wherein each task comprises a respective plurality of batches of training data; and
   training the machine learning model on the training data, wherein during the training, posterior distribution parameters that parameterize the posterior distribution are optimized such that the trained values of the model parameters are defined by trained values of the posterior distribution parameters, wherein the training comprises, at each of a plurality of training iterations:
      selecting a task from the plurality of tasks in accordance with a current task selection policy;
      selecting a batch of training data from the plurality of batches of training data for the selected task;
      training the machine learning model on the selected batch of training data to determine updated values of the model parameters from current values of the model parameters, comprising training the machine learning model on the selected batch of training data to determine adjusted values of the posterior distribution parameters from current values of the posterior distribution parameters;

determining a learning progress measure that represents a progress of the training of the machine learning model as a result of training the machine learning model on the selected batch of training data; and updating the current task selection policy based on the learning progress measure, comprising:
determining a payoff achieved at the training iteration from the learning progress measure; and
updating the current task selection policy using the payoff to encourage selection of tasks that maximize a cumulative measure of payoffs achieved over the plurality of training iterations.

2. The method of claim 1, wherein training the machine learning model on the selected batch comprises training the machine learning model to decrease a loss on the selected batch as measured by a loss function, and wherein the learning progress measure is based on a decrease in the loss as a result of training the machine learning model on the selected batch of training data.

3. The method of claim 2, wherein determining the learning progress measure comprises:
determining a first loss on the selected batch in accordance with the current values of the model parameters; and
determining a second loss on the selected batch in accordance with the updated values of the model parameters, and
wherein the learning progress measure comprises a difference between the first loss and the second loss.

4. The method claim 1, wherein determining the learning progress measure comprises:
sampling a new batch from the plurality of batches in the selected task;
determining a first loss on the new batch in accordance with the current values of the model parameters; and
determining a second loss on the new batch in accordance with the updated values of the model parameters, and
wherein the learning progress measure comprises a difference between the first loss and the second loss.

5. The method of claim 1, wherein one of the tasks is identified as a target task that includes training inputs that are most similar to inputs to be processed by the machine learning model after the training of the machine learning model on the training data, wherein determining the learning progress measure comprises:
sampling a new batch from the plurality of batches in the target task;
determining a first loss on the new batch in accordance with the current values of the model parameters; and
determining a second loss on the new batch in accordance with the updated values of the model parameters, and
wherein the learning progress measure comprises a difference between the first loss and the second loss.

6. The method of claim 1, wherein determining the learning progress measure comprises:
sampling a task randomly from the plurality of tasks;
sampling a new batch from the plurality of batches in the sampled task;
determining a first loss on the new batch in accordance with the current values of the model parameters; and
determining a second loss on the new batch in accordance with the updated values of the model parameters, and
wherein the learning progress measure comprises a difference between the first loss and the second loss.

7. The method of claim 1, wherein the learning progress measure comprises a norm of a gradient vector of gradients of the loss function with respect to the model parameters generated by training the machine learning model on the selected batch.

8. The method of claim 1, wherein the learning progress measure is based on an increase in model complexity of the machine learning model as a result of training the machine learning model on the selected batch of training data.

9. The method of claim 1, wherein determining the learning progress measure comprises:
determining a first Kullback-Leibler (KL) divergence between (i) the posterior distribution as defined by the updated values of the posterior distribution parameters and (ii) a prior distribution over possible values for the model parameters; and
determining a second KL divergence between (i) the posterior distribution as defined by the current values of the posterior distribution parameters and (ii) a prior distribution over possible values for the model parameters, and
wherein the learning progress measure comprises a difference between the first KL divergence and the second KL divergence.

10. The method of claim 9, wherein the prior distribution is defined by prior distribution parameters, wherein training the machine learning model on the selected batch of training data comprises determining adjusted values of the prior distribution parameters from current values of the prior distribution parameters, wherein the first KL divergence is a KL divergence between (i) the posterior distribution as defined by the updated values of the posterior distribution parameters and (ii) the prior distribution as defined by the updated values of the prior distribution parameters, and wherein the second KL divergence is a KL divergence between (i) the posterior distribution as defined by the current values of the posterior distribution parameters and (ii) the prior distribution as defined by the current values of the prior distribution parameters.

11. The method of claim 1,
wherein training the machine learning model on the selected batch of training data comprises determining adjusted values of prior distribution parameters from current values of prior distribution parameters, wherein the prior distribution parameters parametrize a prior distribution over possible values for the model parameters, and
wherein the learning progress measure is based on a) a gradient with respect to the posterior distribution parameters and the prior distribution parameters of a KL divergence between (i) the posterior distribution as defined by the current values of the posterior distribution parameters and (ii) the prior distribution as defined by the current values of the prior distribution parameters and b) a gradient with respect to the posterior distribution parameters of the expectation of a loss on the selected batch as measured by a loss function.

12. The method of claim 1, wherein the learning progress measure is based on a difference between a first norm of a vector of the updated values of the model parameters and a second norm of a vector of the current values of the model parameters.

13. The method of claim 1, wherein the learning progress measure is based on a product between (i) a transpose of a vector of the current values of the model parameters and (ii) a gradient vector of gradients of a loss function with respect to the model parameters generated as part of training the machine learning model on the selected batch.

14. The method of claim 1, wherein the task selection policy is a policy that assigns a respective likelihood to each of the plurality of tasks, and wherein selecting a task from the plurality of tasks in accordance with the current task selection policy comprises stochastically selecting the task in accordance with the likelihoods assigned by the current task selection policy.

15. The method of claim 14, wherein the task selection policy is an adversarial bandits policy, wherein updating the current task selection policy using the payoff comprises:
updating the current task selection policy using the payoff by an adversarial bandits algorithm.

16. The method of claim 1, wherein determining the payoff comprises:
normalizing the learning progress measure to generate a normalized learning progress measure by dividing the learning progress measure by a normalization factor for the selected task; and
generating the payoff by scaling the normalized learning progress measure to fall within a payoff range.

17. The method of claim 16, wherein the normalization factor for the selected task is a time required for the machine learning model to generate outputs for training inputs in the selected task or an approximation of the time required.

18. The method of claim 17, wherein the approximation is a number of time steps required for the machine learning model to generate outputs for training inputs in the selected batch, or a number of individual inputs in each of the training inputs in the selected batch.

19. The method of claim 1, wherein selecting a batch of training data from the plurality of batches of training data in the selected task comprises:
randomly selecting a batch of training data from the plurality of batches of training data in the selected task.

20. The method of claim 1 wherein the machine learning model is a recurrent neural network.

21. A system comprising one or more computers and one or more storage devices storing instructions that when executed by the one or more computers cause the one or more computers to perform operations for training a machine learning model having a plurality of model parameters to determine trained values of the model parameters from initial values of the model parameters, wherein values of the model parameters are defined by a posterior distribution over possible values of the model parameters, the operations comprising:
receiving training data for training the machine learning model on a plurality of tasks, wherein each task comprises a respective plurality of batches of training data; and
training the machine learning model on the training data, wherein during the training, posterior distribution parameters that parameterize the posterior distribution are optimized such that the trained values of the model parameters are defined by trained values of the posterior distribution parameters, wherein the training comprises, at each of a plurality of training iterations:
selecting a task from the plurality of tasks in accordance with a current task selection policy;
selecting a batch of training data from the plurality of batches of training data for the selected task;
training the machine learning model on the selected batch of training data to determine updated values of the model parameters from current values of the model parameters, comprising training the machine learning model on the selected batch of training data to determine adjusted values of the posterior distribution parameters from current values of the posterior distribution parameters;
determining a learning progress measure that represents a progress of the training of the machine learning model as a result of training the machine learning model on the selected batch of training data; and
updating the current task selection policy based on the learning progress measure, comprising:
determining a payoff achieved at the training iteration from the learning progress measure; and
updating the current task selection policy using the payoff to encourage selection of tasks that maximize a cumulative measure of payoffs achieved over the plurality of training iterations.

22. One or more non-transitory computer storage media storing instructions that when executed by one or more computers cause the one or more computers to perform operations for training a machine learning model having a plurality of model parameters to determine trained values of the model parameters from initial values of the model parameters, wherein values of the model parameters are defined by a posterior distribution over possible values of the model parameters, the operations comprising:
receiving training data for training the machine learning model on a plurality of tasks, wherein each task comprises a respective plurality of batches of training data; and
training the machine learning model on the training data, wherein during the training, posterior distribution parameters that parameterize the posterior distribution are optimized such that the trained values of the model parameters are defined by trained values of the posterior distribution parameters, wherein the training comprises, at each of a plurality of training iterations:
selecting a task from the plurality of tasks in accordance with a current task selection policy;
selecting a batch of training data from the plurality of batches of training data for the selected task;
training the machine learning model on the selected batch of training data to determine updated values of the model parameters from current values of the model parameters, comprising training the machine learning model on the selected batch of training data to determine adjusted values of the posterior distribution parameters from current values of the posterior distribution parameters;
determining a learning progress measure that represents a progress of the training of the machine learning model as a result of training the machine learning model on the selected batch of training data; and
updating the current task selection policy based on the learning progress measure, comprising:
determining a payoff achieved at the training iteration from the learning progress measure; and
updating the current task selection policy using the payoff to encourage selection of tasks that maximize a cumulative measure of payoffs achieved over the plurality of training iterations.

* * * * *